(12) United States Patent
Chang et al.

(10) Patent No.: US 10,432,493 B2
(45) Date of Patent: Oct. 1, 2019

(54) DATA COMMUNICATION USING A PREFERRED TRANSFER MODE

(71) Applicant: HEWLETT-PACKARD DEVELOPMENT COMPANY, L.P., Houston, TX (US)

(72) Inventors: Han-Kuang Chang, Taipei (TW); Yi Kang Hsieh, Taipei (TW); Chih-Ming Huang, Taipei (TW); Leo Gerten, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/516,488

(22) PCT Filed: Nov. 26, 2014

(86) PCT No.: PCT/US2014/067645
§ 371 (c)(1),
(2) Date: Apr. 3, 2017

(87) PCT Pub. No.: WO2016/085496
PCT Pub. Date: Jun. 2, 2016

(65) Prior Publication Data
US 2018/0241657 A1 Aug. 23, 2018

(51) Int. Cl.
*H04L 12/26* (2006.01)
*H04L 29/06* (2006.01)
*H04L 29/08* (2006.01)

(52) U.S. Cl.
CPC .......... *H04L 43/0888* (2013.01); *H04L 67/02* (2013.01); *H04L 67/06* (2013.01); *H04L 67/1068* (2013.01); *H04L 69/18* (2013.01); *H04L 69/24* (2013.01)

(58) Field of Classification Search
CPC ......... G06F 17/30035; G06F 17/30017; H04L 63/061; H04L 63/166; H04L 67/16; H04W 36/0033; H04W 80/06
See application file for complete search history.

(56) References Cited

U.S. PATENT DOCUMENTS 5,710,941 A * 1/1998 Parry .................... G06F 3/0619
710/14
6,243,832 B1 * 6/2001 Eckes ................. G06F 11/3414
714/33

(Continued)

FOREIGN PATENT DOCUMENTS

CN 103529793 1/2014

OTHER PUBLICATIONS

"AirSync, Life Without Wires"; https://www.doubletwist.com/airsync/; Aug. 17, 2011; 2 pages.

(Continued)

*Primary Examiner* — Hoang-Chuong Q Vu
(74) *Attorney, Agent, or Firm* — HPI Patent Department

(57) ABSTRACT

An example implementation relates to identifying a preferred transfer mode available for communicating with a target device, from among a plurality of priority-ordered transfer modes that includes a peer-to-peer mode, an FTP mode, and an HTTP mode. A data communication can be performed with the target device using the preferred transfer mode.

17 Claims, 6 Drawing Sheets

(56) References Cited

U.S. PATENT DOCUMENTS

| | | | |
|---|---|---|---|
| 7,277,950 B1* | 10/2007 | Chapweske | H04L 67/104 709/227 |
| 8,352,550 B2 | 1/2013 | Boudreau et al. | |
| 8,390,670 B1* | 3/2013 | Gottlieb | H04N 7/15 348/14.12 |
| 2002/0080721 A1 | 6/2002 | Tobagi et al. | |
| 2002/0099844 A1 | 7/2002 | Baumann et al. | |
| 2004/0078716 A1* | 4/2004 | Schulze | G06F 11/267 714/43 |
| 2004/0212548 A1* | 10/2004 | Ruttenberg | G06F 3/1423 345/1.1 |
| 2005/0105530 A1 | 5/2005 | Kono | |
| 2005/0182824 A1* | 8/2005 | Cotte | H04L 29/06 709/217 |
| 2006/0155864 A1 | 7/2006 | Izumi | |
| 2006/0184543 A1* | 8/2006 | Fukuta | H04N 1/00244 |
| 2008/0313351 A1 | 12/2008 | Mobasser | |
| 2009/0323632 A1* | 12/2009 | Nix | H04L 29/125 370/331 |
| 2010/0080412 A1* | 4/2010 | Zafar | G06Q 10/10 382/100 |
| 2010/0235498 A1* | 9/2010 | Handa | H04N 7/17318 709/224 |
| 2011/0225417 A1* | 9/2011 | Maharajh | G06F 21/10 713/150 |
| 2011/0246983 A1 | 10/2011 | Brunet et al. | |
| 2012/0044354 A1 | 2/2012 | Cheng et al. | |
| 2012/0066357 A1* | 3/2012 | McFate | G06F 9/5027 709/221 |
| 2012/0151075 A1 | 6/2012 | Mraz et al. | |
| 2013/0144714 A1* | 6/2013 | Yuan | H04L 65/4069 705/14.47 |
| 2013/0166580 A1* | 6/2013 | Maharajh | H04L 65/605 707/758 |
| 2014/0006558 A1* | 1/2014 | Zhao | H04L 67/06 709/217 |
| 2014/0040616 A1* | 2/2014 | Barber | G06F 11/1453 713/168 |
| 2014/0085666 A1 | 3/2014 | Park | |
| 2014/0341109 A1* | 11/2014 | Cartmell | H04L 45/308 370/328 |

OTHER PUBLICATIONS

"C2W Wireless Backup"; May 3, 2012; 2 pages; http://www.clickfree.com/product_attribute_selector_show/id/C2DW.

"Sweet Home WiFi Picture Backup"; Jul. 24, 2013; 3 pages htttps://play.google.com/store/apps/details?id=sweesoft.sweethome&hl=en.

"Syncing Data Between Your Phone and Your Computer"; Mar. 6, 2013; 2 pages; http://www.htc.com/us/support/htc-one/howto/365643.html.

Ayeleasebee; "Seagate shows off Wireless Plus, Central, and Backup Plus external storage at CES 2013"; Jan. 7, 2013; 8 pages.

Huawei et al: "Remove 24.234 fro WLAN selection procedures", 3GPP Draft; C1-140760_Remove 24 234 From WLAN Selection Procedures_24302_REL12.

Qualcomm: "A 3G/LTE Wi-FI Offload Framework: Connectivity Engine (CnE) to Manage Inter-System Radio Cennections and Applications".

* cited by examiner

DATA COMMUNICATION USING A PREFERRED TRANSFER MODE

BACKGROUND

Various data communication applications and technologies exist for transferring data between electronic devices. In some instances, a data transfer route between electronic devices may include one or more segments that utilize a wireless communication technology. Additionally, the speed and/or throughput of a wireless communication technology may be inversely correlated with the range of the wireless communication technology.

BRIEF DESCRIPTION OF THE DRAWINGS

Various examples will be described below with reference to the following figures.

DETAILED DESCRIPTION

Figure 1:
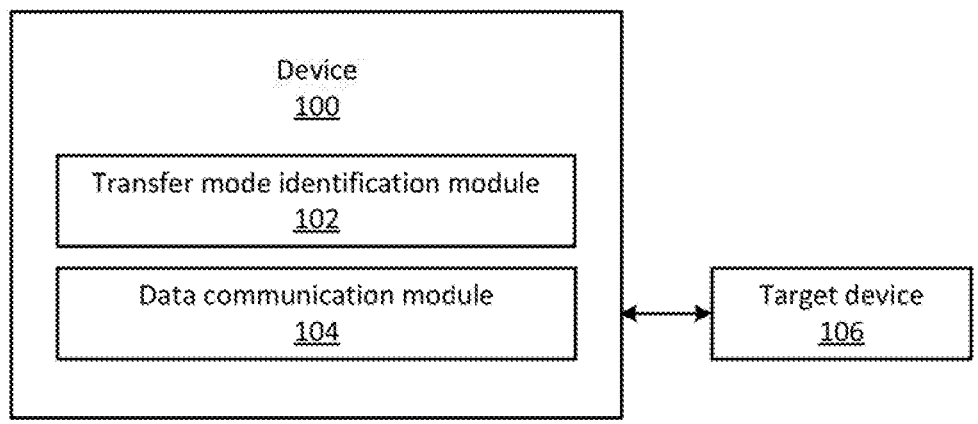
FIG. 1 is a block diagram of a device for performing a data communication using a preferred transfer mode according to an example implementation.

Various data communication applications and technologies exist for communicating between electronic devices, some of which may be devices of a mesh network and/or a cloud-based platform. User satisfaction with a data communication operation, such as uploading or downloading a file from cloud-based storage, may depend on various factors, such as a speed of the operation, a duration of the operation, and a completion success rate, among others.

Some data transfer routes for communicating between devices may include one or more segments that utilize a slower wireless communication technology (e.g., 3G mobile telecommunications), which may cause a data throughput bottleneck, reduce overall data transfer speed of the route, and ultimately reduce user satisfaction. Also, the speed and/or throughput of a wireless communication technology may be inversely correlated with the range of the wireless communication technology, which may impact route planning, data transfer speed, and the likelihood of successful completion of a data communication operation (e.g., an ongoing data communication operation may fail if a mobile device involved in the data communication operation travels outside the range associated with the data transfer).

Additionally, data transfer over the data transfer route is generally coordinated by applications (i.e., machine-readable instructions executable by a processor), such as File Transfer Protocol (FTP) applications, HyperText Transfer Protocol (HTTP) applications, and applications using Wi-Fi Direct™. Some applications may be compatible only with certain data transfer routes. Even if a data transfer route can support different applications, some applications may have different capabilities than other applications in some respects, such as speed and error handling.

For example, a wireless peer-to-peer data transfer between devices, such as a Wi-Fi Direct™-based transfer over the IEEE 802.11 ac wireless standard, can transfer data at a throughput of approximately 50 MB/s or greater, within a range of approximately 10 meters. As another example, FTP can transfer data between devices on a personal wireless local network (e.g., devices that are connected through an access point using the IEEE 802.11n wireless standard), at a data throughput of approximately 20 MB/s or greater and over a range of 100 meters. As another example, HTTP can transfer data between devices over a route that is at least partially conducted over mobile telecommunications (e.g., a 3G mobile telecommunications) and/or includes third-party server nodes (e.g., the Internet), at a data throughput of less than approximately 2 MB/s and over a potentially unlimited range. Additionally, in some circumstances, FTP may be faster than HTTP in some respects, owing to, for example, lower protocol overhead (e.g., smaller or no package headers accompanying FTP data transfers), driver-based FTP acceleration and optimization, and other efficiencies.

Accordingly, it may be useful for devices to automatically identify a preferred transfer mode (e.g., an application operating over a particular route or network architecture) for performing a robust and high speed data transfer between devices.

FIG. 1 is a block diagram of a device 100 for performing a data communication using a preferred transfer mode according to an example implementation. The device 100 can include a transfer mode identification module 102 and a data communication module 104. A module can include a set of instructions encoded on a machine-readable medium and executable by a processor of the device. Additionally or alternatively, a module can include a hardware device comprising electronic circuitry for implementing the functionality described below. The device 100 can also include one or more wired or wireless electronic communication technologies, such as Ethernet, USB, optical fiber, the IEEE 1394 standards (FireWire®), the IEEE 802.11 standards (Wi-Fi®), Bluetooth® or low-energy Bluetooth®, ZigBee®, infrared communications, mobile telecommunications (also known as cellular telecommunications), satellite communications, near-field communications, and/or other short or long-range radio communications.

The transfer mode identification module 102 can identify a preferred transfer mode that is available for communicating between the device 100 and a target device 106, from among a plurality of priority-ordered transfer modes that includes a peer-to-peer mode, an FTP mode, and an HTTP mode. The transfer modes can be priority-ordered, in that each of the transfer modes can be assigned an order of priority in the transfer mode identification module 102, and, in some example implementations, the order of priority of the transfer modes can be, from highest priority to lowest priority, the peer-to-peer mode, the FTP mode, and the HTTP mode. In some example implementations, the order of priority can be based on aspects of the transfer modes such as throughput, bandwidth, connectivity range, or the like.

Additionally, in some example implementations, the transfer mode identification module 102 can be configured to test the availability of the transfer modes by executing a service discovery protocol or by attempting to communicate between the device 100 and the target device 106 using the transfer mode to be tested. Moreover, in some example implementations, the transfer mode identification module 102 can be configured to test the availability of the priority-ordered transfer modes in a sequential manner and to select the first transfer mode tested to be available (in other words, determined to be available) to be the preferred transfer mode, while in other example implementations, the transfer mode identification module 102 can be configured to test the availability of the transfer modes in a simultaneous manner and to select the highest priority transfer mode tested to be available to be the preferred transfer mode. Accordingly, the preferred transfer mode can be identified by the transfer mode identification module 102 as a transfer mode that is available for communicating between the device 100 and the target device 106 that also has a high priority (or in some implementations, a highest priority).

The data communication module 104 can perform a data communication with the target device 106 using a preferred transfer mode (e.g., a preferred transfer mode identified by the transfer mode identification module 102). In some example implementations, the data communication can be a data backup operation, a data synchronization operation, a file browsing operation, a file sharing operation, or other data operation. In some example implementations, the data communication can be part of or associated with a cloud computing operation, such as access to cloud-based storage, services, infrastructure, or computing platforms.

In some example implementations, a transfer mode, as referred to herein, can include an application (i.e., instructions encoded on a machine-readable medium and executable by a processor) that performs a data communication between the device 100 and the target device 106 over a particular network architecture. Example implementations of the transfer modes (e.g., the peer-to-peer mode, the FTP mode, and the HTTP mode) will now be discussed.

In some example implementations, the peer-to-peer mode can facilitate direct data communication between the device 100 and the target device 106, without an intermediary device. For example, the peer-to-peer mode can comprise an application that is executed by the data communication module 104 to perform a data communication between the device 100 and the target device 106 using a peer-to-peer wireless communication technology such as Wi-Fi Direct®, Bluetooth®, ZigBee®, infrared data transfer, near-field communications, or the like.

In some example implementations, the FTP mode can include an FTP application (that is, an application that utilizes the File Transfer Protocol) that is executed by the data communication module 104 to perform the data communication between the device 100 and the target device 106 over a local network. In some example implementations, the local network can include at least one wireless access point (e.g., operating on an IEEE 802.11-family standard). In some example implementations, the local network can communicate data between the device 100 and the target device 106 without routing data through the Internet.

In some example implementations, the HTTP mode can include an HTTP application (that is, an application that utilizes the HyperText Transfer Protocol) that is executed by the data communication module 104 to perform the data communication between the device 100 and the target device 106 by way of mobile telecommunications (e.g., a 3G or 4G mobile telecommunications), a mobile access gateway, a third-party server node, and/or the Internet.

In some example implementations, each of the plurality of priority-ordered transfer modes (i.e., the peer-to-peer mode, the FTP mode, and the HTTP mode) can include at least one wireless communication technologies, such as those described above (e.g., a IEEE 802.11-family standard, mobile telecommunications, Bluetooth®, or the like), for communicating between the device 100 and the target device 106. Some wireless communication technologies are faster than other wireless communication technologies. Accordingly, by virtue of the transfer mode identification module 102 and the data communication module 104, the device 100 can perform high throughput data communications with the target device 106.

In some example implementations, the device 100 and/or the target device 106 can be a laptop computer, a desktop computer, a workstation, a mobile phone, a tablet computing device, a wearable computing device, a server, a network attached storage, a personal cloud storage, or other electronic device. In some example implementations, the device 100 and/or the target device 106 can be nodes of a mesh network, and the nodes of the mesh network can be analogous (e.g., have functions and/or components similar to) to the device 100. For example, the target device 106 can be analogous to the device 100, such that the target device 106 also includes a transfer mode identification module and a data communication module. By virtue of the mesh network having nodes that are analogous to device 100, each node of the mesh network can be capable of identifying the highest throughput path to other nodes in the mesh network and a mesh network routing algorithm can determine the highest throughput route between route endpoints of the mesh network.

Figure 2:
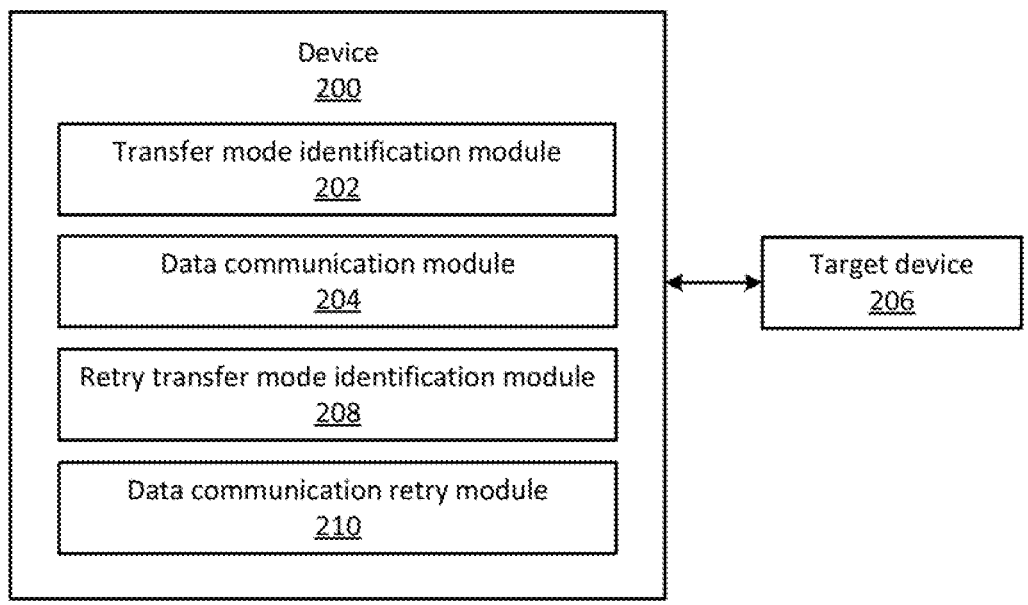
FIG. 2 is a block diagram of a device for performing a data communication using a preferred transfer mode according to another example implementation.

FIG. 2 is a block diagram of a device 200 for performing a data communication using a preferred transfer mode according to another example implementation. The device 200 can include a transfer mode identification module 202, a data communication module 204, a retry transfer mode identification module 208, and a data communication retry module 210. A module can include a set of instructions encoded on a machine-readable medium and executable by a processor of the device. Additionally or alternatively, a module can include a hardware device comprising electronic circuitry for implementing the functionality described below. As with the device 100, the device 200 can also include one or more wired or wireless electronic communication technologies, such as Ethernet, USB, optical fiber, the IEEE 1394 standards (e.g., FireWire®), the IEEE 802.11 standards (Wi-Fi®), Bluetooth® or low-energy Bluetooth®, ZigBee®, infrared communications, mobile telecommunications, satellite communications, near-field communications, and/or other short or long-range radio communications.

The transfer mode identification module 202 and the data communication module 204 can be analogous in many respects to the transfer mode identification module 102 and the data communication module 104, respectively, of the device 100.

As with the transfer mode identification module 102, the transfer mode identification module 202 can identify a preferred transfer mode that is available for communicating between the device 200 and a target device 206, from among a plurality of priority-ordered transfer modes that includes a peer-to-peer mode, an FTP mode, and an HTTP mode. The peer-to-peer mode, FTP mode, and HTTP mode can be analogous to the respective transfer modes described above with respect to FIG. 1. In some example implementations, the transfer mode identification module 202 can retry identifying a preferred transfer mode if no transfer modes are tested to be available.

As with the data communication module 104, the data communication module 204 can perform a data communication with the target device 206 using the preferred transfer mode identified by the transfer mode identification module 202.

In some cases, the data communication performed by the data communication module 204 may be interrupted. For example, while the data communication is being performed using the preferred transfer mode identified by the transfer mode identification module 202, a timeout of the preferred transfer mode may interrupt the data communication. A timeout can occur, for example, when the device 200 and/or the target device 206 move out of a connectivity range of the preferred transfer mode, or when the device 200 and/or the target device 206 becoming unresponsive. When the data communication has been interrupted, the retry transfer mode identification module 208 can identify a preferred retry transfer mode available for communicating with the target device 206, from among the plurality of priority-ordered transfer modes.

The data communication retry module 210 can retry at least part of the interrupted data communication using the preferred retry transfer mode identified by the retry transfer mode identification module 208. For example, the data communication retry module 210 can continue the data communication from the point of interruption.

As with the device 100 and the target device 106, the device 200 and the target device 206 also can be a laptop computer, a desktop computer, a workstation, a mobile phone, a tablet computing device, a wearable computing device, a server, a network attached storage, a personal cloud storage, or other electronic device, and the device 200 and/or the target device 206 also can be nodes of a mesh network.

Figure 3:
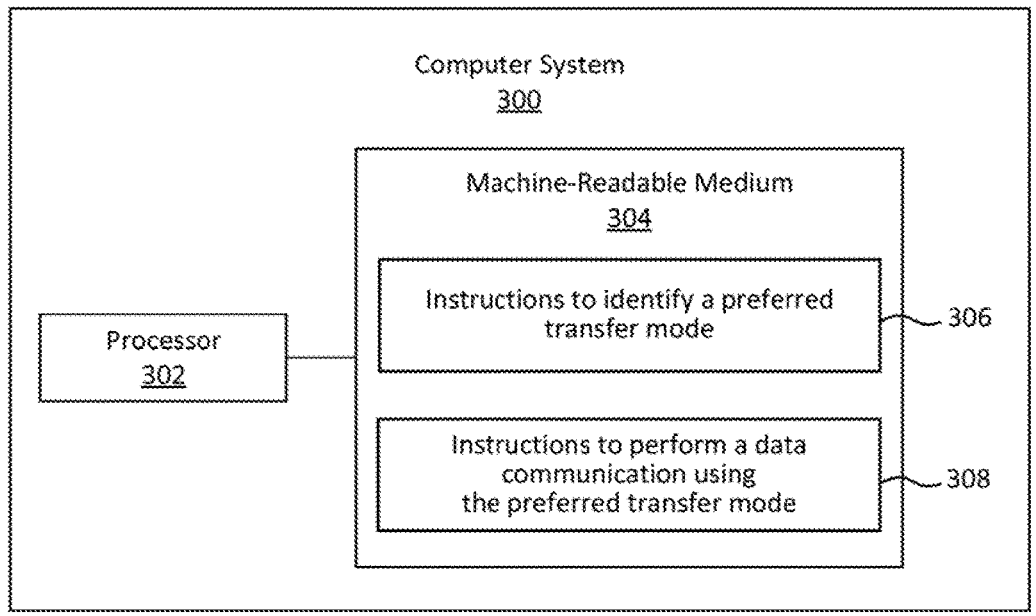
FIG. 3 is a block diagram of a device that includes a machine-readable medium encoded with instructions to perform a data communication using a preferred transfer mode according to an example implementation.

FIG. 3 is a block diagram of a computer system 300 that includes a machine-readable medium encoded with instructions to perform a data communication according to an example implementation. In some example implementations, computer system 300 can be a laptop computer, a desktop computer, a workstation, a mobile phone, a tablet computing device, a wearable computing device, a server, a network attached storage, a personal cloud storage, or other electronic device. The computer system 300 can include a processor 302 coupled to a machine-readable medium 304. In some example implementations, the computer system 300 can serve as or form part of the device 100 or the target device 106 of FIG. 1.

The processor 302 can include a central processing unit, a multiple processing unit, a microprocessor, an application-specific integrated circuit, a field programmable gate array, and/or other hardware device suitable for retrieval and/or execution of instructions from the machine-readable medium 304 (e.g. instructions 306 and 308) to perform the various functions discussed herein. Additionally or alternatively, the processor 302 can include electronic circuitry for performing the functionality of instructions 306 and/or 308.

The machine-readable medium 304 can be any medium suitable for storing executable instructions, such as random access memory (RAM), electrically erasable programmable read-only memory (EEPROM), flash memory, hard disk drives, optical discs, and the like. In some example implementations, the machine-readable medium 304 can be a non-transitory medium, where the term "non-transitory" does not encompass transitory propagating signals. As described further herein below, the machine-readable medium 304 can be encoded with a set of executable instructions 306 and 308.

Instructions 306 can identify a preferred transfer mode available for communicating with a target device, from among a plurality of priority-ordered transfer modes that includes, in order from highest priority to lowest priority, a peer-to-peer mode (e.g., an application transferring data using Wi-Fi Direct® or the like), an FTP mode, and an HTTP mode, although other orders of priority can also be used. The peer-to-peer mode, FTP mode, and HTTP mode can be analogous to the respective transfer modes described above with respect to FIG. 1.

Instructions 308 can perform a data communication (such as, for example, a data backup, a data synchronization, a file sharing, a file browsing, a cloud computing operation, and the like) with the target device using the preferred transfer mode (e.g., the preferred transfer mode identified by instructions 304).

Figure 4:
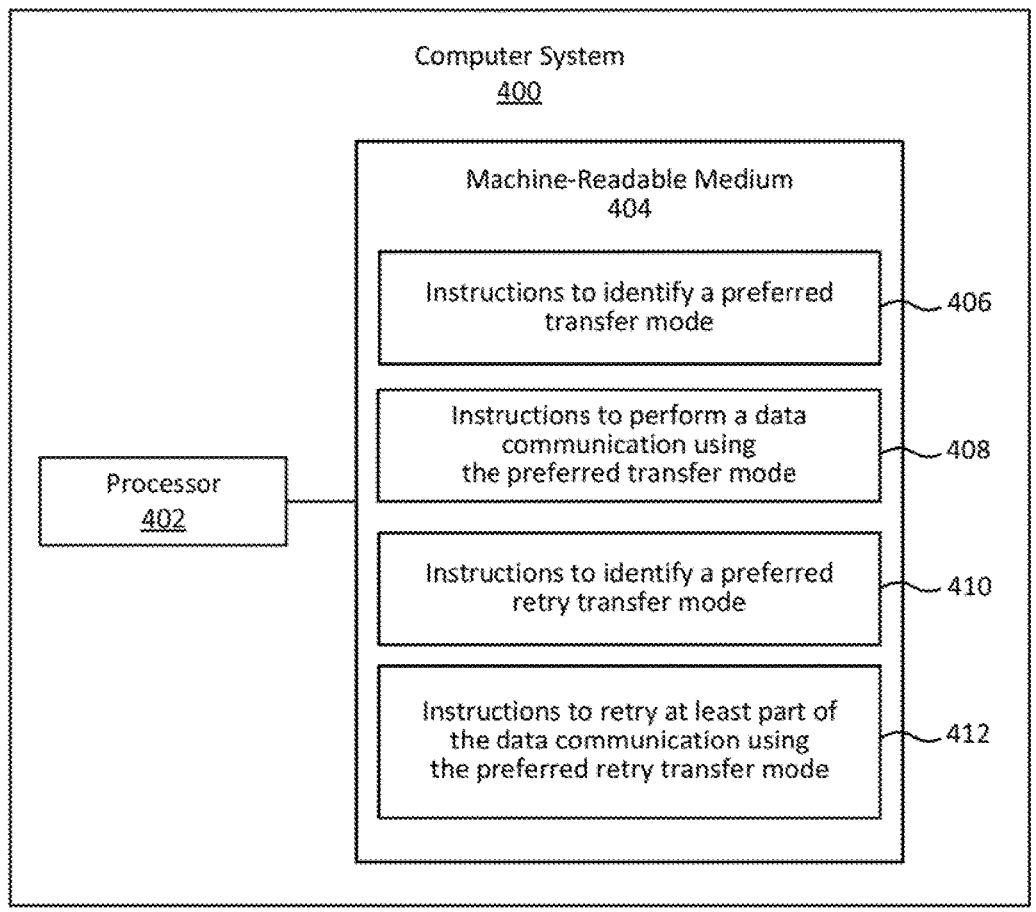
FIG. 4 is a block diagram of a device that includes a machine-readable medium encoded with instructions to perform a data communication using a preferred transfer mode according to another example implementation.

FIG. 4 is a block diagram of a computer system 400 that includes a machine-readable medium encoded with instructions to perform a data communication according to another example implementation. In some example implementations, computer system 400 can be a laptop computer, a desktop computer, a workstation, a mobile phone, a tablet computing device, a wearable computing device, a server, a network attached storage, a personal cloud storage, or other electronic device. In some example implementations, the computer system 400 can serve as or form part of the device 200 or the target device 206 of FIG. 2.

The computer system 400 can include a processor 402 coupled to a machine-readable medium 404, and the processor 402 and the machine-readable medium 404 can be analogous in many respects to the processor 302 and the machine-readable medium 304, respectively. The machine-readable medium 404 can be encoded with a set of executable instructions 406, 408, 410, and 412. Additionally or alternatively, the processor 402 can include electronic circuitry for performing the functionality of instructions 406, 408, 410, and/or 412.

Instructions 406 can identify a preferred transfer mode for communicating with a target device in a manner analogous to that described with respect to instructions 306 stored on the machine-readable medium 304. Instructions 408 can perform a data communication with the target device in a manner analogous to that described with respect to instructions 308 stored on the machine-readable medium 304.

Instructions 410 can identify a preferred retry transfer mode available for communicating with the target device from among the plurality of priority-ordered transfer modes, when the data communication (e.g., the data communication performed by instructions 408) is interrupted, for example, by a timeout of the preferred transfer mode. Instructions 412 can retry at least part of the interrupted data communication using the preferred retry transfer mode (e.g., the preferred retry transfer mode identified by instructions 410). In some example implementations, instructions 410 and 412 can include a counter which limits the number of times the instructions 410 and 412 are performed in response to interruptions of a particular data communication. When the counter reaches the limit, the processor 402 can generate an alert indicating that the data communication cannot be completed. In other words, in some example implementations, an interrupted data communication can be retried a limited number of times.

Figure 5:
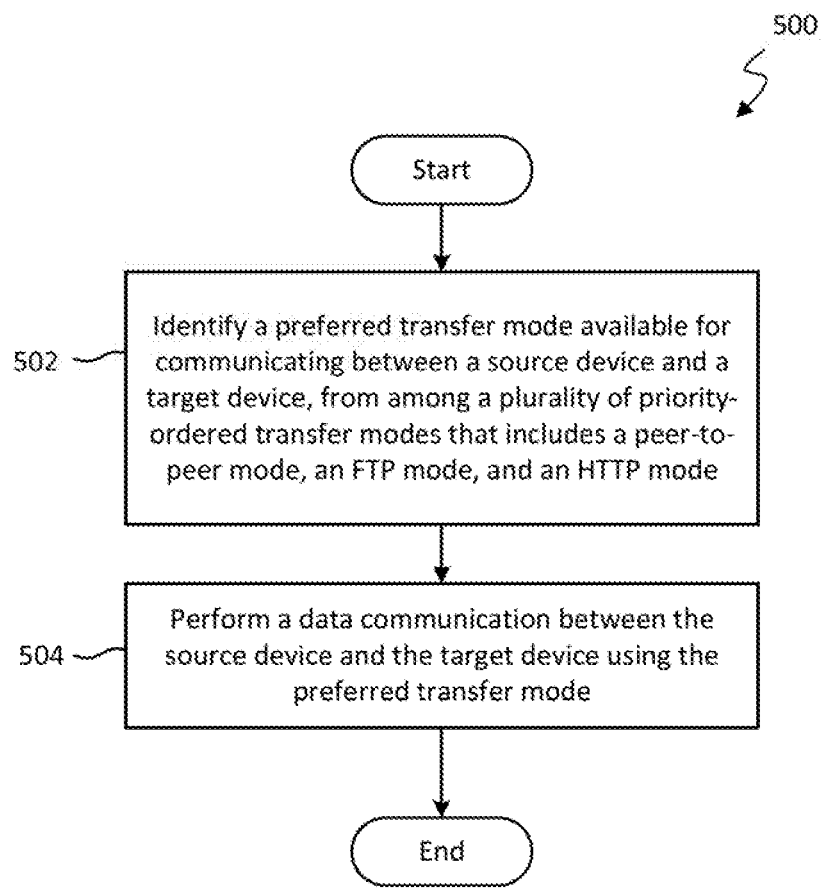
FIG. 5 is a flow diagram of a method for performing a data communication using a preferred transfer mode according to an example implementation.

FIG. 5 is a flow diagram of a method 500 for performing a data communication using a preferred transfer mode according to an example implementation. The method 500 can be implemented in the form of executable instructions stored on a machine-readable medium and/or in the form of electronic circuitry.

Although execution of the method 500 is described below with reference to the processor 302 of FIG. 3, it should be understood that execution of the method 500 can be performed by other suitable devices, such as the device 100 and/or the target device 106 of FIG. 1, the device 200 and/or the target device 206 of FIG. 2, and the processor 402 of FIG. 4.

The method 500 starts, and at block 502, the processor 302 can identify a preferred transfer mode available for communicating between a source device and a target device, from among a plurality of priority-ordered transfer modes that can include a peer-to-peer mode, an FTP mode, and an HTTP mode. For example, each of the transfer modes can be assigned an order of priority, which, in some example implementations, can be based on an aspect of the transfer modes, such as throughput, bandwidth, connectivity range, latency, or the like. More particularly, in some example implementations, the order of priority of the priority-ordered transfer modes can be, from highest priority to lowest priority, the peer-to-peer mode, the FTP mode, and the HTTP mode, although other orders of priority can also be used. The peer-to-peer mode, FTP mode, and HTTP mode can be analogous to the respective transfer modes described above with respect to FIG. 1.

To perform block 502, the processor 302 can identify, as the preferred transfer mode, a transfer mode that has a high order of priority (or, in other example implementations, the highest order of priority) and also is available for communicating between the source device and the target device. The availability of a transfer mode can be tested by the processor 302 by executing a service discovery protocol or by attempting to communicate between the source device and the target device using the transfer mode being tested, for example. The transfer mode identified as having a high order of priority and as being available for communicating between the source device and the target device can be deemed to be the preferred transfer mode.

In block 504, the processor 302 performs a data communication between the source device and the target device using the preferred transfer mode identified in block 502. For example, the data communication can be a data backup operation, a data synchronization operation, a file browsing operation, a file sharing operation, a cloud computing operation, or other data operation. Additionally, the data communication can include one-way or two-way communications between the source device and the target device. In some example implementations, the source device and/or the target device can be a cloud device.

In some example implementations, the source device and/or the target device can be nodes of a mesh network, and the data communication between the source device and the target device can relay data as part of a multi-hop route.

Figure 6:
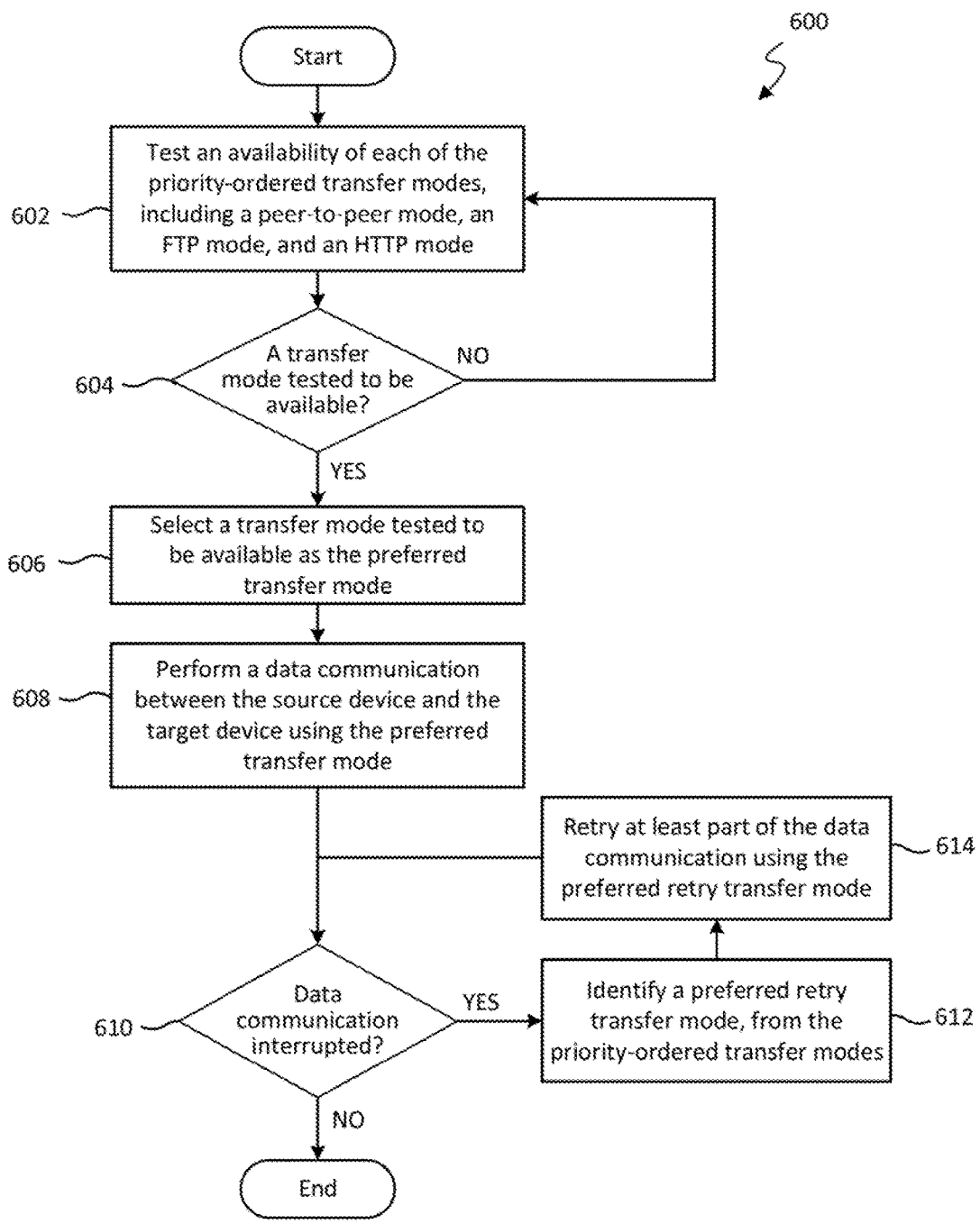
FIG. 6 is a flow diagram of a method for performing a data communication using a preferred transfer mode according to another example implementation.

FIG. 6 is a flow diagram of a method 600 for performing a data communication using a preferred transfer mode according to another example implementation. The method 600 can be implemented in the form of executable instructions stored on a machine-readable medium and/or in the form of electronic circuitry.

Although execution of the method 600 is described below with reference to the processor 402 of FIG. 4, it should be understood that execution of the method 600 can be performed by other suitable devices, such as the device 100 and/or the target device 106 of FIG. 1, the device 200 and/or the target device 206 of FIG. 2, and the processor 302 of FIG. 3.

The method 600 starts, and at block 602, the processor 402 can test an availability of a plurality of priority-ordered transfer modes for communicating between the source device and the target device. As described above with reference to method 500, the plurality of priority-ordered transfer modes can include a peer-to-peer mode, an FTP mode, and an HTTP mode, and each of the transfer modes can be assigned an order of priority. More particularly, in some example implementations, the order of priority of the priority-ordered transfer modes can be, from highest priority to lowest priority, the peer-to-peer mode, the FTP mode, and the HTTP mode, although other orders of priority can also be used. In some example implementations, the processor 402 tests the availability of the transfer modes by executing a service discovery protocol or by attempting to communicate between the source device and the target device using the transfer mode being tested, for example.

More particularly, in some example implementations, the processor 402 can perform block 602 by testing simultaneously the availability of each of the priority-ordered transfer modes for communicating between the source device and the target device.

In other example implementations, the processor 402 can perform block 602 by testing the availability of the priority-ordered transfer modes sequentially, in order from highest priority to lowest priority, or more particularly, by testing the availability of the priority-ordered transfer modes sequentially until a first transfer mode is tested to be available. For example, the processor 402 can test first whether the peer-to-peer mode is available. If the peer-to-peer mode is available, then block 602 ends and the method 600 proceeds to block 604; if the peer-to-peer mode is not available, then block 602 continues and the processor 402 can test whether the FTP mode is available. If the FTP mode is available, then block 602 ends and the method 600 proceeds to block 604; if the FTP mode is not available, then block 602 continues and the processor 402 can test whether the HTTP mode is available, after which the method proceeds to block 604.

In block 604, the processor 402 checks whether at least one transfer mode was tested to be available in block 602. If no transfer modes were tested to be available in block 602 ("NO" at block 604), then the method 600 can retry block 602. In some example implementations, the processor 402 can retry block 602 a limited number of times, and if no transfer modes are tested to be available after the limit has been reached, then the processor 402 can generate an alert indicating that communications cannot be established between the source device and the target device.

If at least one transfer mode was tested to be available in block 602 ("YES" at block 604), then the method 600 proceeds to block 606. In block 606, the processor 402 can select a transfer mode tested to be available in block 602 to be the preferred transfer mode.

More particularly, in the example implementations where the testing in block 602 is performed simultaneously, the processor 402 selects a high priority transfer mode tested to be available in block 602 (or, in some implementations, a highest priority transfer mode tested to be available in block 602) to be the preferred transfer mode. For example, the processor 602 can select the highest priority one of the transfer modes tested to be available in block 602 to be the preferred transfer mode, according to the order of priority of the transfer modes (e.g. from highest priority to lowest priority: the peer-to-peer mode, the FTP mode, and the HTTP mode).

In the example implementations where the testing in block 602 is performed sequentially, the processor 402 selects the first transfer mode tested to be available in the testing to be the preferred transfer mode. By virtue of the sequential testing, the first transfer mode tested to be available can be logically deemed to be the highest priority transfer mode available.

In block 608, the processor 402 performs a data communication between the source device and the target device using the preferred transfer mode selected in block 606. Block 608 can be analogous in many respects to block 504 of the method 500. As described above with respect to method 500, in some example implementations, the source device and/or the target device can be nodes of a mesh network, and the data communication between the source device and the target device can relay data as part of a multi-hop route.

In block 610, the processor 402 checks whether the data communication in block 608 was interrupted, for example, by a timeout of the preferred transfer mode. A timeout can occur for a number of reasons, such as the source device and/or the target device moving out of a connectivity range of the preferred transfer mode or one or both of the source device and the target device becoming unresponsive. If the data communication of block 608 is not interrupted by a timeout of the preferred transfer mode ("NO" at block 610), then the data communication can complete, and the method 600 ends.

If the data communication in block 608 is interrupted ("YES" at block 610), then the method 600 proceeds to block 612.

In block 612, the processor 402 identifies a preferred retry transfer mode available for communicating between the source device and the target device, from among the plurality of priority-ordered transfer modes. In some example implementations, the processor 402 identifies the preferred retry transfer mode in block 612 in a manner analogous to the process described in blocks 602, 604, and 606 for identifying the preferred transfer mode in the first instance. In other words, in block 612, the processor 402 can test the availability of the priority-ordered transfer modes and select a high priority transfer mode tested to be available (or more particularly, a highest priority transfer mode tested to be available) as the preferred retry transfer mode.

In block 614, the processor 402 can retry at least part of the interrupted data communication using the preferred retry transfer mode identified in block 612. In some example implementations, the processor 402 can limit the number of times it performs blocks 612 and 614 in response to an interruption of the data communication. If the data communication is interrupted after the processor 402 has reached the limit, then the processor 402 can generate an alert indicating that the data communication cannot be completed.

In view of the foregoing description, it can be appreciated that the performance of a data communication between electronic devices, such as a data backup operation, a data synchronization operation, a file browsing operation, a file sharing operation, a cloud computing operation, or the like, can be improved. More particularly, by virtue of example implementations of the present application, the data communication can be performed with data high throughput and in a manner that is robust to interruptions.

In the foregoing description, numerous details are set forth to provide an understanding of the subject disclosed herein. However, implementation may be practiced without some or all of these details. Other implementations may include modifications and variations from the details discussed above. It is intended that the following claims cover such modifications and variations.

We claim:

1. A method comprising:
   identifying, by a processor, a preferred transfer mode available for communicating between a source device and a target device, from among a plurality of priority-ordered transfer modes that includes a peer-to-peer mode, an FTP mode, and an HTTP mode, wherein the identifying includes:
   testing an availability of the priority-ordered transfer modes for communicating between the source device and the target device, the testing being performed sequentially or simultaneously on the priority-ordered transfer modes;
   selecting one of the priority-ordered transfer modes tested to be available in the testing to be the preferred transfer mode; and
   retrying the testing in a case where no transfer modes tested are available in the testing; and
   performing, by the processor, a data communication between the source device and the target device using the preferred transfer mode.

2. The method of claim 1, wherein an order of priority of the priority-ordered transfer modes, from highest priority to lowest priority, is the peer-to-peer mode, the FTP mode, and the HTTP mode.

3. The method of claim 1, wherein the testing is performed sequentially on the priority-ordered transfer modes in order from highest priority to lowest priority; and
   the selecting includes selecting a first transfer mode tested to be available in the testing to be the preferred transfer mode.

4. The method of claim 1, wherein:
   the testing includes testing simultaneously an availability of the priority-ordered transfer modes for communicating between the source device and the target device; and
   the selecting includes selecting a highest priority one of transfer modes tested to be available in the testing to be the preferred transfer mode.

5. The method of claim 1, further comprising, in a case where the data communication is interrupted:
   identifying, by the processor, a preferred retry transfer mode available for communicating between the source device and the target device, from among the plurality of priority-ordered transfer modes; and
   retrying, by the processor, at least part of the data communication using the preferred retry transfer mode.

6. The method of claim 1, wherein the source device, the target device, or both the source device and the target device are nodes of a mesh network.

7. A device comprising:
   a processor; and
   a memory storing instructions that, when executed, cause the processor to:
   identify a preferred transfer mode available for communicating with a target device, from among a plurality of priority-ordered transfer modes that includes a peer-to-peer mode, an FTP mode, and an HTTP mode;

perform a data communication with the target device using the preferred transfer mode;
identify a preferred retry transfer mode available for communicating with the target device from among the plurality of priority-ordered transfer modes when the data communication with the target device is interrupted; and
retry at least part of the data communication using the preferred retry transfer mode.

8. The device of claim 7, wherein an order of priority of the priority-ordered transfer modes is based on a throughput of the transfer modes, a connectivity range of the transfer modes, or the throughput and the connectivity range of the transfer modes.

9. The device of claim 7, wherein the FTP mode comprises an FTP application executed by the processor to perform the data communication with the target device over a local network.

10. The device of claim 7, wherein the HTTP mode comprises an HTTP application executed by the processor to perform the data communication with the target device by way of a third-party server, mobile telecommunications, or a mobile access gateway.

11. The device of claim 7, wherein the target device is a node of a mesh network.

12. The device of claim 7, wherein the instructions executable to cause the processor to identify the preferred transfer mode include instructions executable to cause the processor to:
test an availability of the priority-ordered transfer modes for communicating between a source device and the target device, the testing being performed sequentially on the priority-ordered transfer modes in order from highest priority to lowest priority;
select a first transfer mode tested to be available in the testing to be the preferred transfer mode; and
retry the testing in a case where no transfer modes tested are available in the testing.

13. The device of claim 7, wherein the instructions to cause the processor to identify the preferred transfer mode include instructions to cause the processor to:
test simultaneously an availability of the priority-ordered transfer modes for communicating between a source device and the target device;
select a highest priority one of transfer modes tested to be available in the testing to be the preferred transfer mode; and
retry the testing in a case where no transfer modes tested are available in the testing.

14. A non-transitory machine-readable medium storing instructions that, when executed by a processor, cause the processor to:
identify a preferred transfer mode available for communicating with a target device, from among a plurality of priority-ordered transfer modes that includes, in order from highest priority to lowest priority, a peer-to-peer mode, an FTP mode, and an HTTP mode;
perform a data communication with the target device using the preferred transfer mode;
identify a preferred retry transfer mode available for communicating with the target device, from among the plurality of priority-ordered transfer modes when the data communication with the target device is interrupted; and
retry at least part of the data communication using the preferred retry transfer mode.

15. The non-transitory machine-readable medium of claim 14, further comprising instructions that, when executed by the processor, cause the processor to relay information from a mesh network node to the target device using the preferred transfer mode.

16. The non-transitory machine-readable medium of claim 14, wherein the instructions to cause the processor to identify the preferred transfer mode include instructions to cause the processor to:
test an availability of the priority-ordered transfer modes for communicating between a source device and the target device, the testing being performed sequentially on the priority-ordered transfer modes in order from highest priority to lowest priority;
select a first transfer mode tested to be available in the testing to be the preferred transfer mode; and
retry the testing in a case where no transfer modes tested are available in the testing.

17. The non-transitory machine-readable medium of claim 14, wherein the instructions to cause the processor to identify the preferred transfer mode include instructions to cause the processor to:
test simultaneously an availability of the priority-ordered transfer modes for communicating between a source device and the target device;
select a highest priority one of transfer modes tested to be available in the testing to be the preferred transfer mode; and
retry the testing in a case where no transfer modes tested are available in the testing.

* * * * *

UNITED STATES PATENT AND TRADEMARK OFFICE
CERTIFICATE OF CORRECTION

PATENT NO. : 10,432,493 B2
APPLICATION NO. : 15/516488
DATED : October 1, 2019
INVENTOR(S) : Han-Kuang Chang et al.

Page 1 of 1

It is certified that error appears in the above-identified patent and that said Letters Patent is hereby corrected as shown below:

In the Claims

In Column 10, Line 40, in Claim 4, delete "wherein:" and insert -- wherein --, therefor.

Signed and Sealed this
Twenty-fourth Day of December, 2019

Andrei Iancu
*Director of the United States Patent and Trademark Office*